United States Patent
Maruyama

(10) Patent No.: US 9,584,490 B2
(45) Date of Patent: Feb. 28, 2017

(54) COMPUTER-READABLE, NON-TRANSITORY MEDIUM STORING DIGITAL CONTENT DISTRIBUTING PROGRAM, COMPUTER-READABLE, NON-TRANSITORY MEDIUM STORING DIGITAL CONTENT PLAYBACK PROGRAM, DIGITAL CONTENT DISTRIBUTING APPARATUS AND DIGITAL CONTENT PLAYBACK APPARATUS

(71) Applicant: FUJITSU LIMITED, Kawasaki-shi, Kanagawa (JP)

(72) Inventor: Hidefumi Maruyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/855,751

(22) Filed: Sep. 16, 2015

(65) Prior Publication Data
US 2016/0006704 A1  Jan. 7, 2016

Related U.S. Application Data

(63) Continuation of application No. 13/041,321, filed on Mar. 4, 2011, now abandoned.

(30) Foreign Application Priority Data

Mar. 24, 2010 (JP) ................. 2010-067465

(51) Int. Cl.
*H04L 29/06* (2006.01)
*H04L 9/08* (2006.01)
(Continued)

(52) U.S. Cl.
CPC ........... *H04L 63/0428* (2013.01); *H04L 9/083* (2013.01); *H04L 9/0894* (2013.01); *H04L 67/32* (2013.01);
(Continued)

(58) Field of Classification Search
USPC ........................................................ 713/168
See application file for complete search history.

(56) References Cited

U.S. PATENT DOCUMENTS 6,167,083 A * 12/2000 Sporer .................... G06T 9/004
375/240.01
6,477,649 B2  11/2002 Kambayashi et al.
(Continued)

FOREIGN PATENT DOCUMENTS

JP  11-283327  10/1999

OTHER PUBLICATIONS

USPTO, (Wang) Final Rejection, Mar. 16, 2015, in parent U.S. Appl. No. 13/041,321 [pending].
(Continued)

*Primary Examiner* — Harris C Wang
(74) *Attorney, Agent, or Firm* — Fujitsu Patent Center

(57) ABSTRACT

In digital content including; data in which digital copyrighted work is stored, and a plurality of separation data separated from the data, a header of the data stores position information for specifying a separation region in which one of the separation data is separated. Moreover each separation region in which the separation data is separated, stores position information for specifying other separation regions in an interlinked manner. Furthermore the data excluding the separation region is encrypted by a content key of the data, and the separation region of the data, and the separation data are encrypted respectively by a content key different for each separation data. Moreover, the separation data is distributed together with the content key on a route different to the data.

1 Claim, 16 Drawing Sheets

(51) Int. Cl.
- *H04N 21/4623* (2011.01)
- *H04N 21/63* (2011.01)
- *H04N 21/6334* (2011.01)
- *H04N 21/658* (2011.01)
- *H04N 21/845* (2011.01)
- *H04N 21/854* (2011.01)
- *H04L 29/08* (2006.01)

(52) U.S. Cl.
CPC ........ *H04N 21/4623* (2013.01); *H04N 21/631* (2013.01); *H04N 21/63345* (2013.01); *H04N 21/6581* (2013.01); *H04N 21/8455* (2013.01); *H04N 21/8456* (2013.01); *H04N 21/85406* (2013.01); *H04L 2209/603* (2013.01)

(56) References Cited

U.S. PATENT DOCUMENTS

| | | |
|---|---|---|
| 7,343,495 B2 | 3/2008 | Kambayashi et al. |
| 7,747,871 B2 | 6/2010 | Kambayashi et al. |
| 8,595,139 B2 * | 11/2013 | Maruyama ............ G06Q 30/06 705/59 |
| 2004/0015724 A1 | 1/2004 | Pham et al. |
| 2007/0071405 A1 * | 3/2007 | Choi ........................ H04L 69/22 386/239 |
| 2007/0083473 A1 * | 4/2007 | Farrugia ............. G06F 21/6218 705/57 |
| 2008/0058973 A1 * | 3/2008 | Hirata .................. G11B 27/105 700/94 |
| 2012/0057708 A1 * | 3/2012 | Maruyama ............. H04L 9/083 380/278 |

OTHER PUBLICATIONS

USPTO, (Wang) Non-Final Rejection, Aug. 11, 2014, in parent U.S. Appl. No. 13/041,321 [pending].
USPTO, (Wang) Advisory Action, Feb. 5, 2014, in parent U.S. Appl. No. 13/041,321 [pending].
USPTO, (Wang) Final Rejection, Oct. 11, 2013, in parent U.S. Appl. No. 13/041,321 [pending].
USPTO, (Wang) Non-Final Rejection, Dec. 14, 2012, in parent U.S. Appl. No. 13/041,321 [pending].

* cited by examiner

| DATA/SEPARATION DATA, CONTENT KEY IDENTIFIER |
| --- |
| DATA/SEPARATION DATA, CONTENT KEY |
| CONTENT KEY IDENTIFIER OF NEXT SEPARATION DATA |
| CONTENT KEY SOURCE INFORMATION OF NEXT SEPARATION DATA |
| ENCRYPTED SEPARATION DATA (NO DATA IN CASE OF DATA) |

| NAME OF PUBLISHER |
| --- |
| NUMBER OF EXPIRED SEPARATION DATA |
| CONTENT KEY IDENTIFIER OF EXPIRED SEPARATION DATA |
| DIGITAL SIGNATURE WITH ROUTE PUBLIC KEY CERTIFICATE |

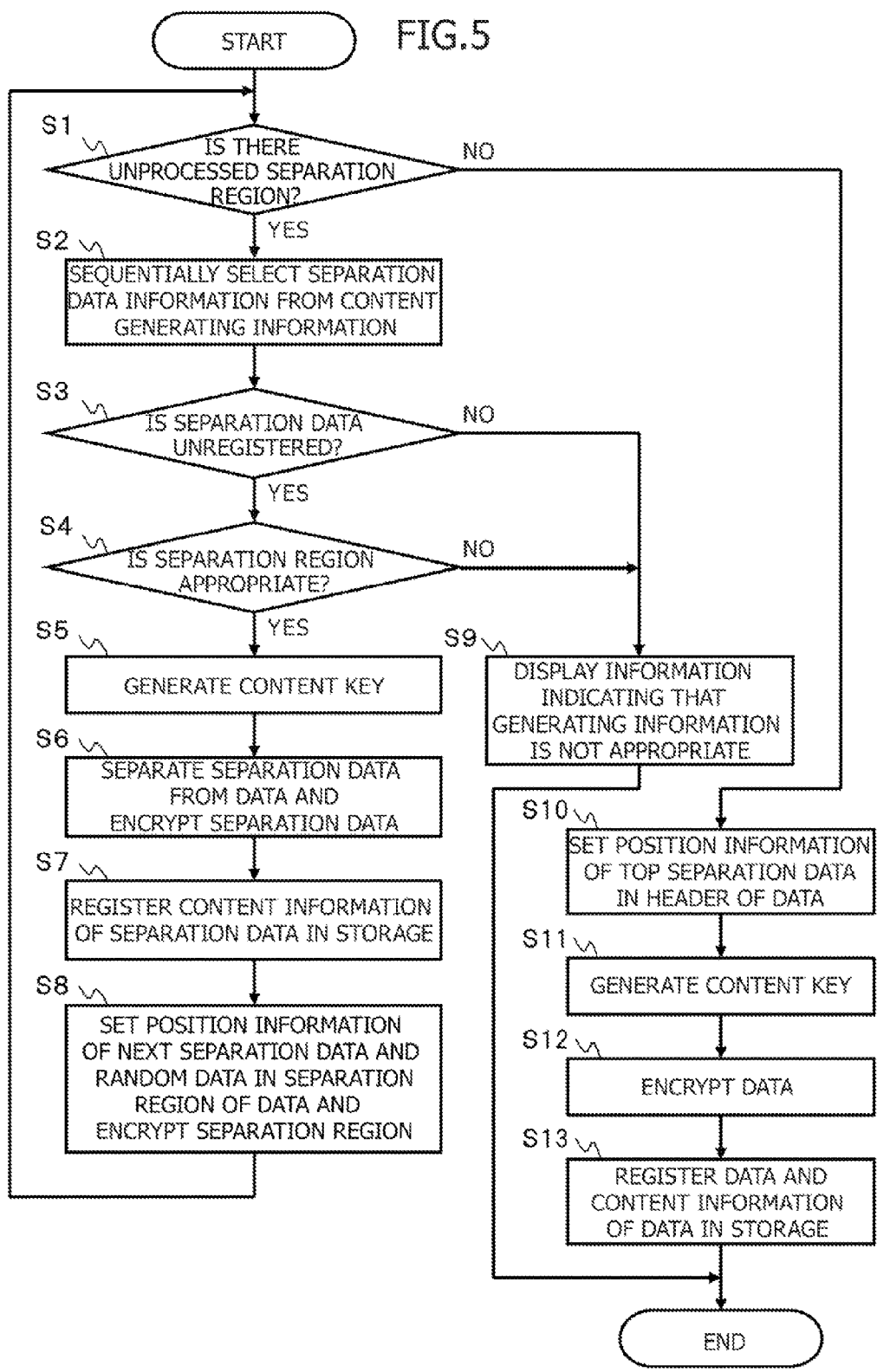

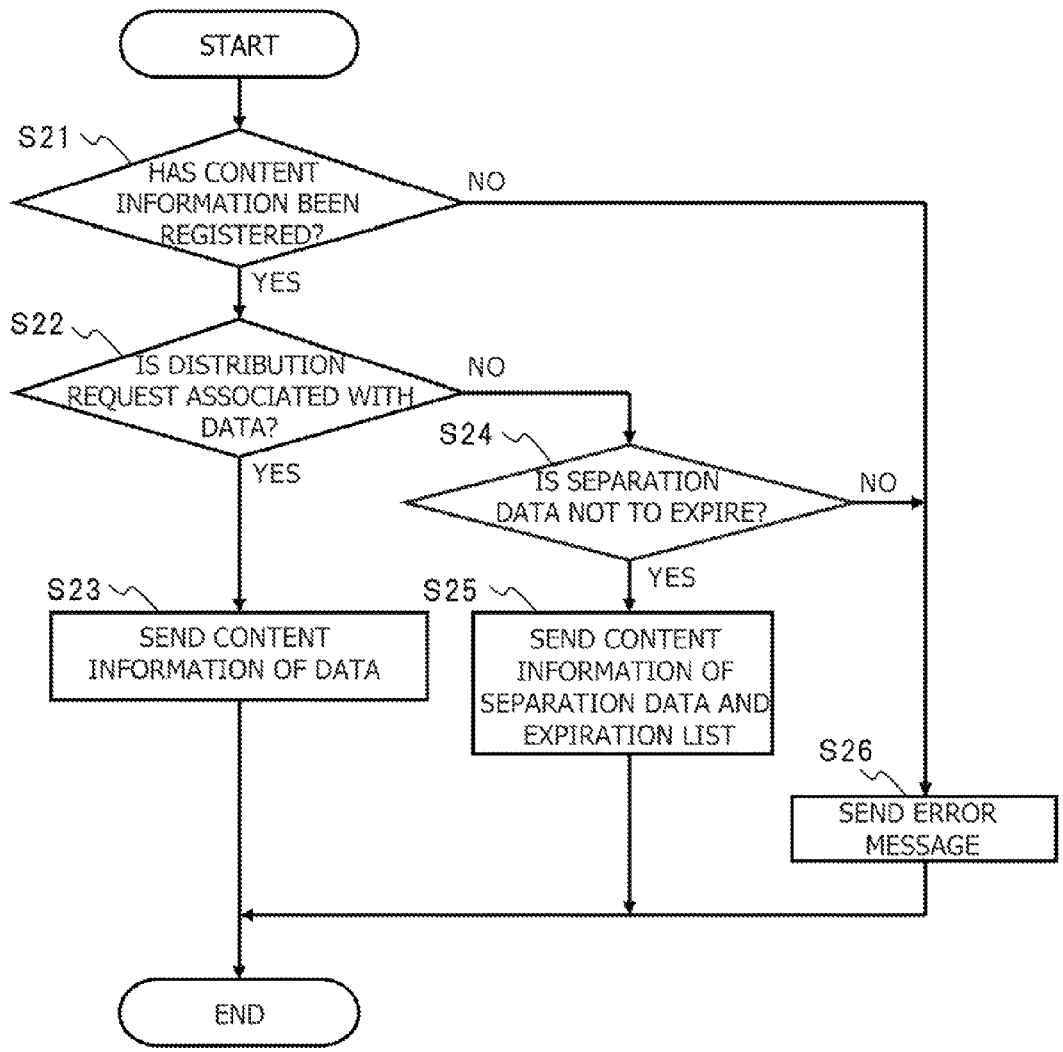

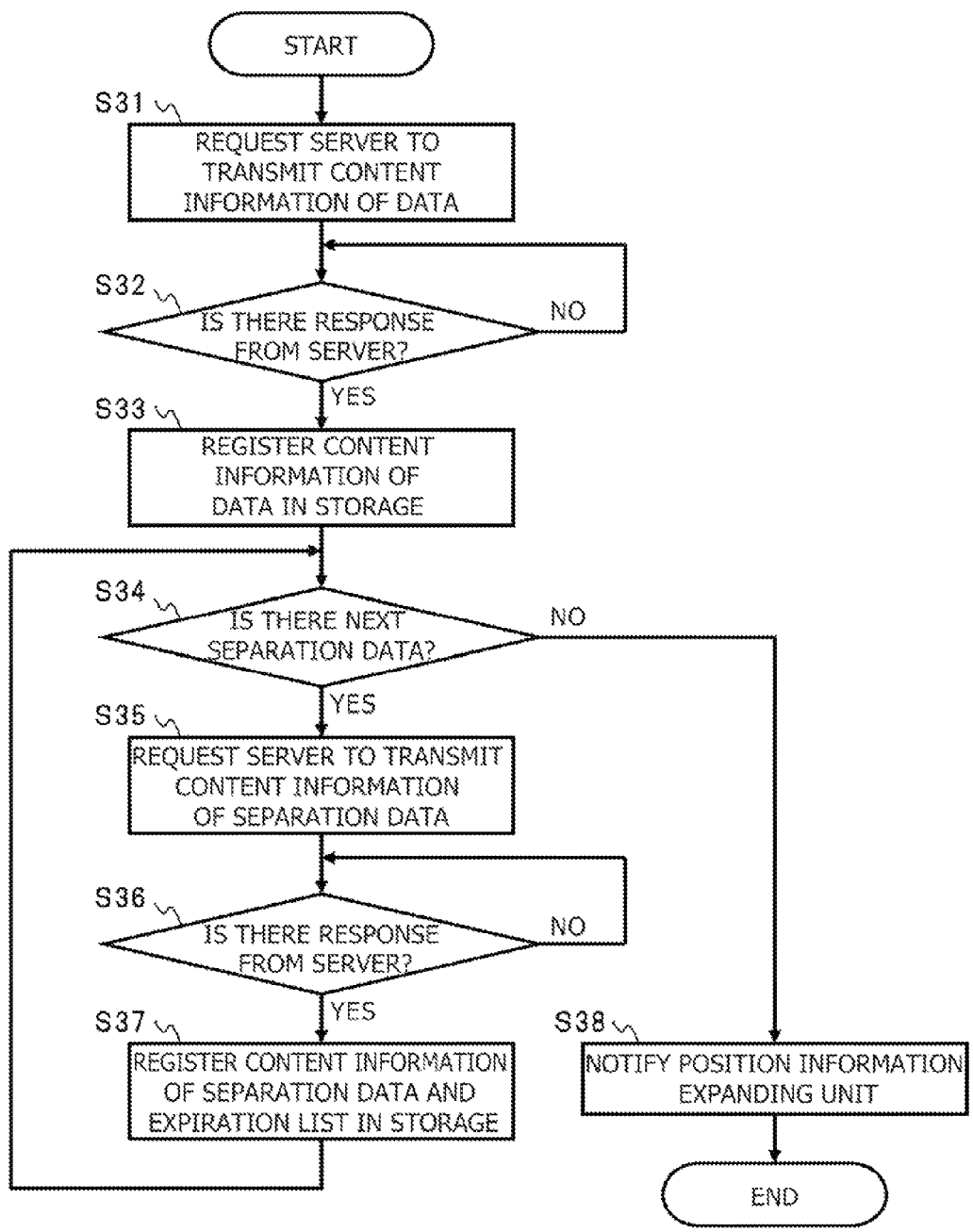

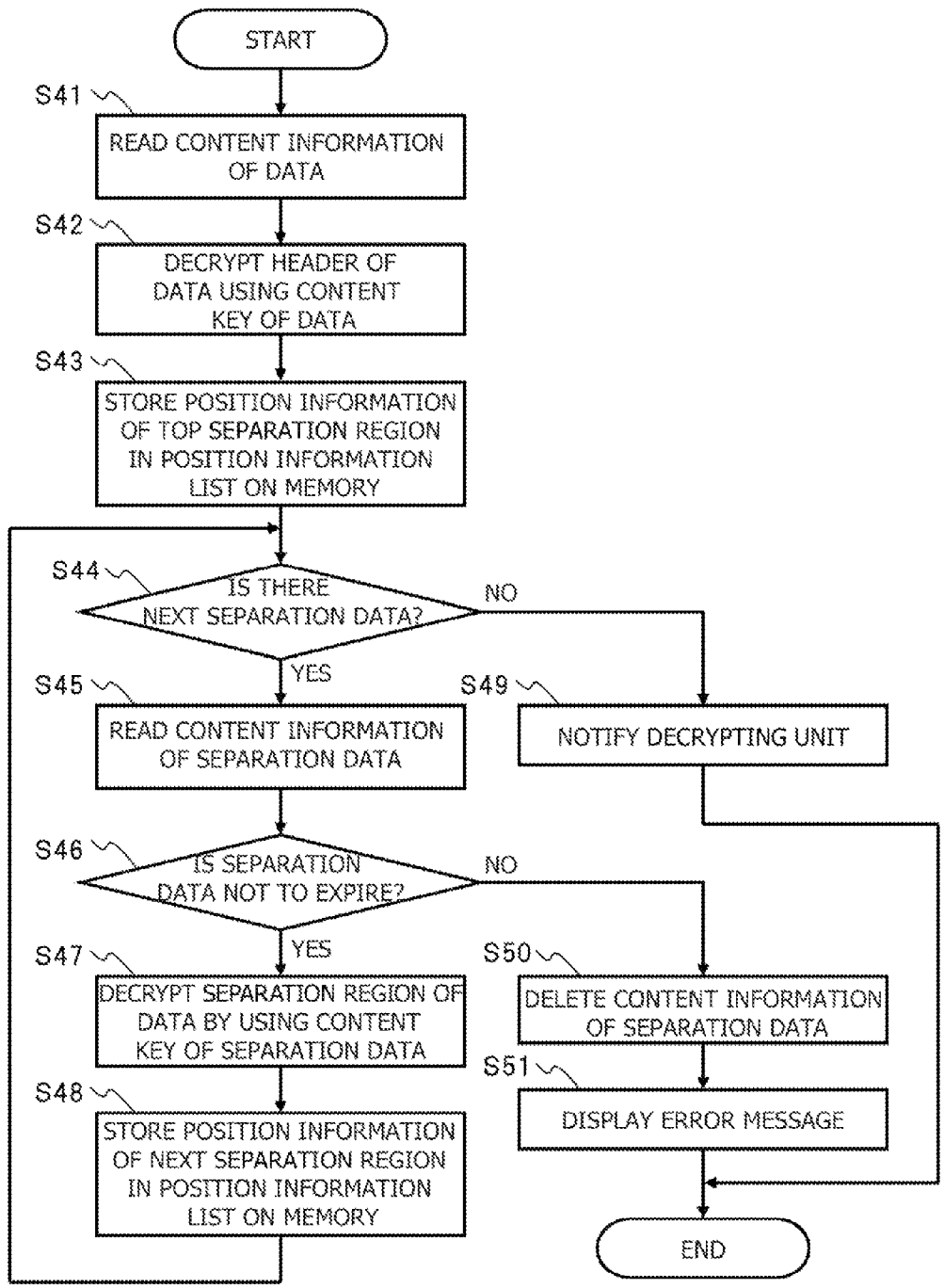

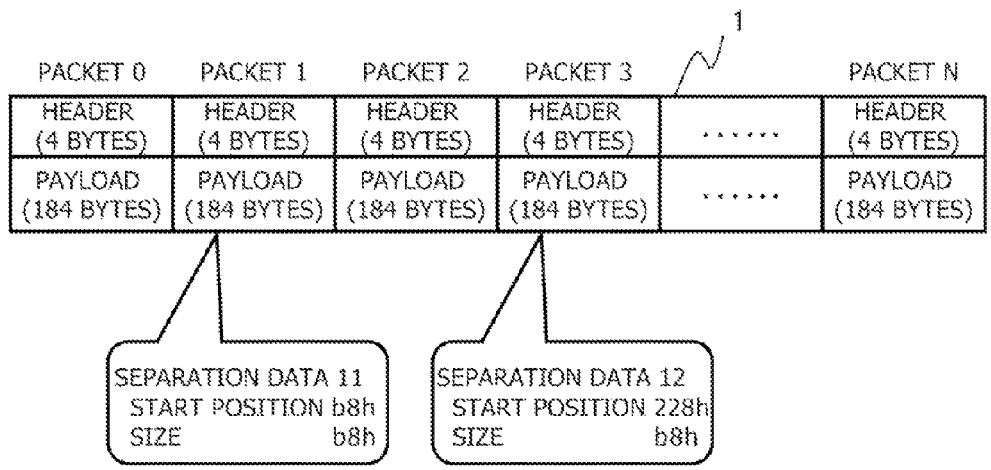

FIG.18

| CONTENT KEY IDENTIFIER OF SEPARATION DATA 12 | 000100010001000000000000001002h |
|---|---|
| CONTENT KEY OF SEPARATION DATA 12 | xxxxxxxxxxxxxxxxxxxxxxxxxxxxxxxxh |
| CONTENT KEY IDENTIFIER OF NEXT SEPARATION DATA | NULL |
| CONTENT KEY SOURCE INFORMATION OF NEXT SEPARATION DATA | NULL |
| ENCRYPTED SEPARATION DATA OF SEPARATION DATA 12 | ENCRYPTED DATA OF PAYLOAD OF PACKET 3 |

500

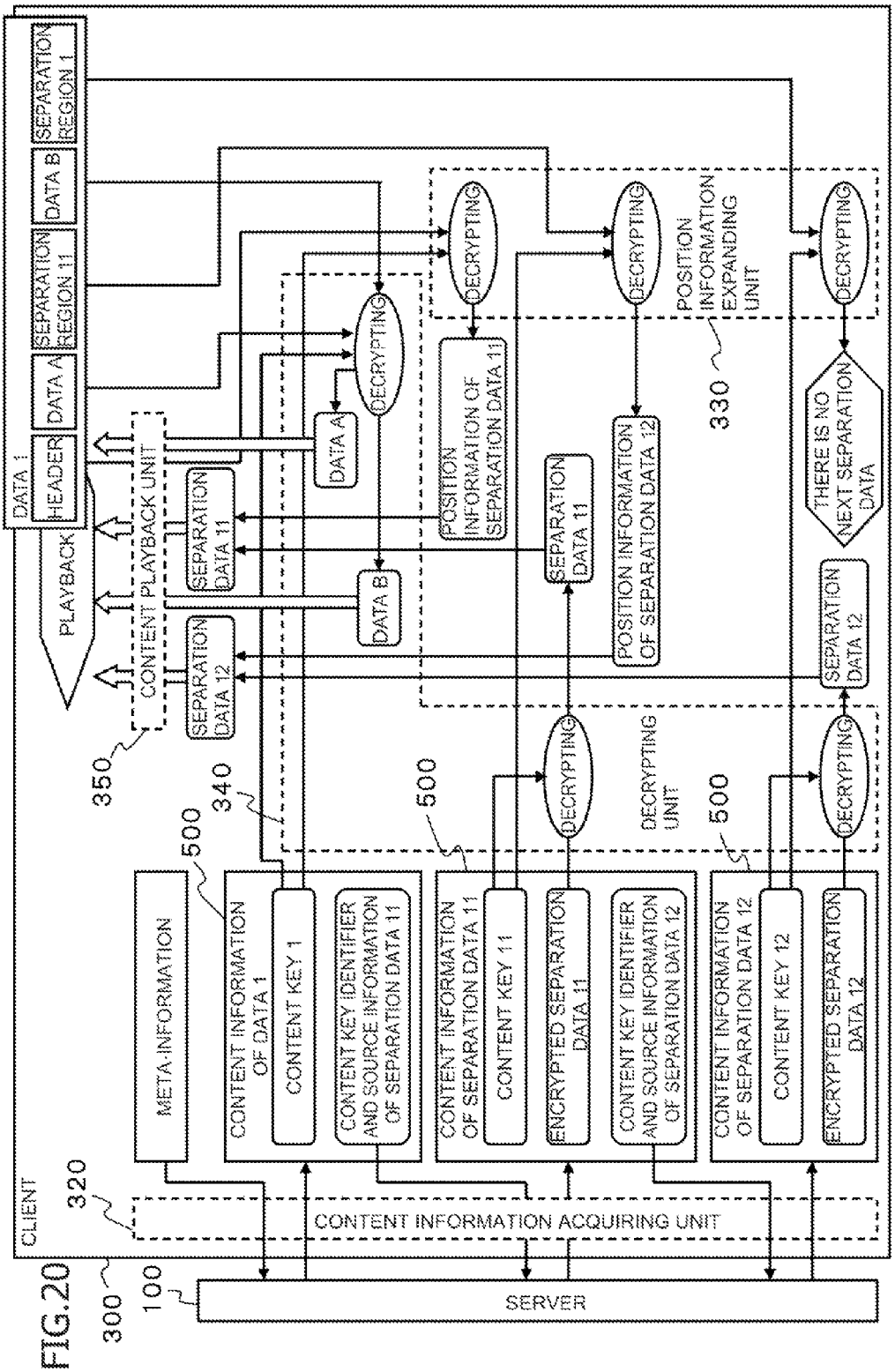

COMPUTER-READABLE, NON-TRANSITORY MEDIUM STORING DIGITAL CONTENT DISTRIBUTING PROGRAM, COMPUTER-READABLE, NON-TRANSITORY MEDIUM STORING DIGITAL CONTENT PLAYBACK PROGRAM, DIGITAL CONTENT DISTRIBUTING APPARATUS AND DIGITAL CONTENT PLAYBACK APPARATUS

CROSS-REFERENCE TO RELATED APPLICATION

This application is a continuation application of application Ser. No. 13/041,321, filed Mar. 4, 2011, which is based upon and claims the benefit of priority of the prior Japanese Patent Application No. 2010-067465, filed on Mar. 24, 2010, the entire contents of which are incorporated herein by reference.

FIELD

The embodiment discussed herein is related to a technique for distributing or playing back digital data.

BACKGROUND

In the case where encrypted digital content is stored on various recording media and circulated, or is circulated via a network, the digital content is exposed to an attack of estimating a content key for decrypting the digital content. Therefore, a technique has been proposed where a part of the digital content is separated from a digital content body and distributed together with a license, to thereby protect the digital content.

However, in the conventional technique, because there is only one separation data separated from the digital content body, the proportion of a region which cannot be used in the digital content body has been small. Therefore, if a third person who has acquired the digital content body can estimate the content key of the digital content body, he/she may be able to use the digital content to some extent, even in a state where the separation data cannot be used.

SUMMARY

According to an aspect of the embodiment, the digital content includes; data in which digital copyrighted work is stored, and a plurality of separation data separated from the data. The data has a header, which stores position information for specifying a separation region in which one of the separation data is separated, and the each separation region in which the separation data is separated, stores position information for specifying other separation regions in an interlinked manner. Moreover, the data excluding the separation data is encrypted by a content key of the data, while the separation region of the data and the separation data separated from the separation region are encrypted respectively by a content key different for each separation data.

Moreover a server that distributes the digital content responds to a request of a content key of the data to send the content key of the data and an identifier for identifying the separation data separated from the separation region specified by the position information stored in the header of the data. Furthermore the server also responds to a distribution request of separation data, to send the separation data, the content key of the separation data, and an identifier for identifying the separation data separated from the separation region specified by the position information stored in the separation region in which the separation data is separated.

On the other hand, a client who plays back the digital content, requests a distribution of the content key of the data, when playback of the data is started. Moreover, a client having received the content key of the data and the identifier for identifying the separation data separated from the separation region specified by the position information stored in the header of the data, requests a distribution of the separation data specified by the identifier. Furthermore, the client having received the separation data, the content key of the separation data, and the identifier for identifying the separation data separated from the separation region specified by the position information stored in the separation region in which the separation data is separated, requests a distribution of the separation data specified by the identifier. Thereafter, the client decrypts the data excluding the separation region by using the content key of the data, and decrypts the separation region of the data and the separation data by using the content key of the separation data. Moreover, the client plays back the data and the separation data based on the separation region specified by the position information stored in the header of the data and in the separation region.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 3 is a diagram for explaining content information;

FIG. 4 is a diagram for explaining an expiration list;

FIG. 5 is a flowchart illustrating a content generating process;

FIG. 6 is a diagram for explaining content generating information;

FIG. 7 is a flowchart illustrating a content distributing process;

FIG. 8 is a flowchart illustrating a content information acquiring process;

FIG. 9 is a flowchart illustrating a position information expanding process;

FIG. 13 is a diagram for explaining a specific example of data to be processed;

FIG. 14 is a diagram for explaining a specific example of the content generating information;

FIG. 18 is a diagram for explaining a specific example of content information of another separation data;

FIG. 20 is a diagram for explaining processes from distribution to playback of the digital content.

DESCRIPTION OF EMBODIMENT

Figure 1:
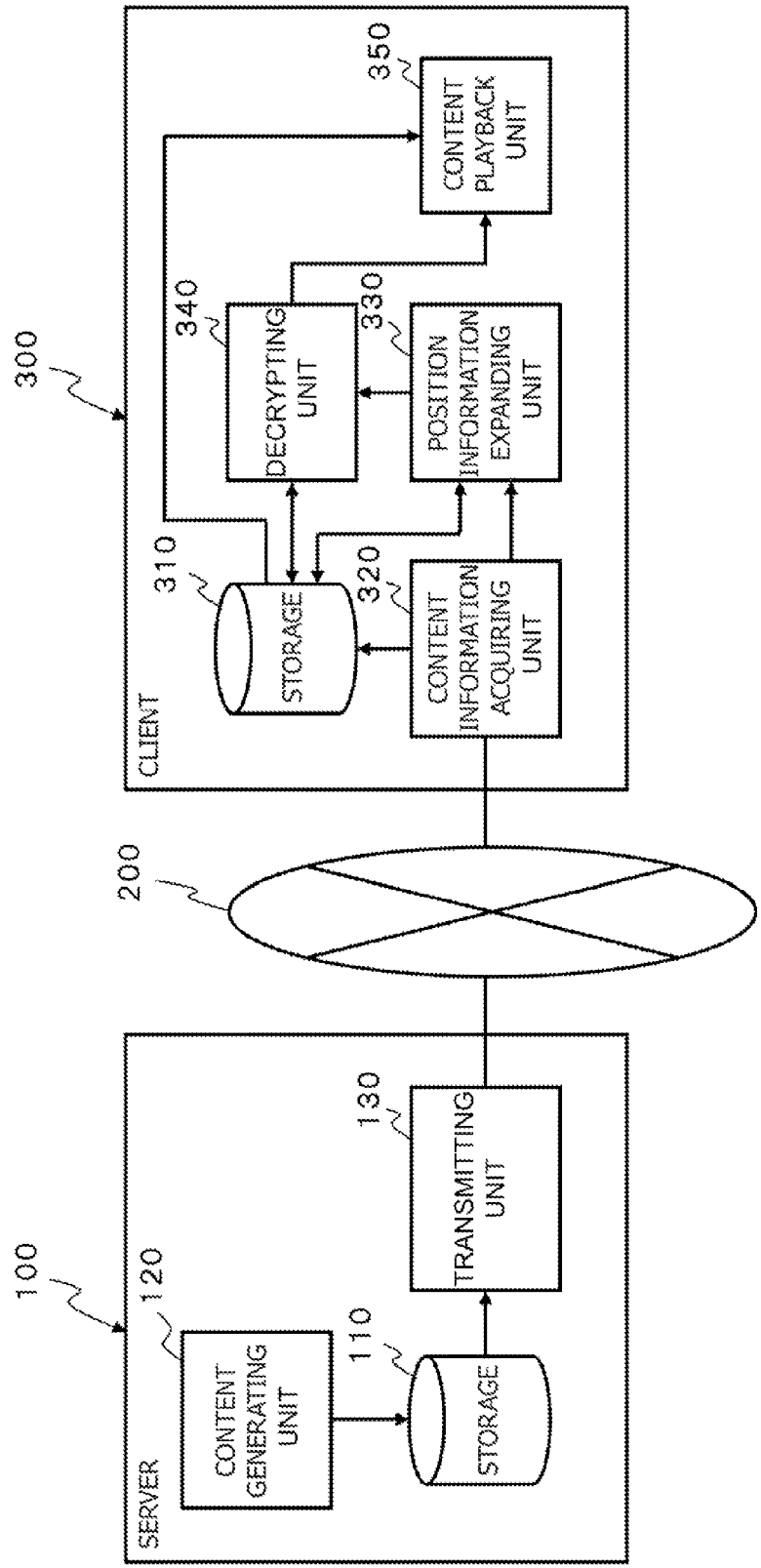
FIG. 1 is a schematic diagram illustrating one example of a computer system to which the present technique is applied.

FIG. 1 is a schematic diagram illustrating one example of a computer system to which the present technique is applied.

A server 100 that generates and distributes digital content, is connected to at least one client 300 that plays back the digital content, via a network such as a local area network (LAN). The server 100 and the client 300 have a digital right management (DRM), which is an example of a technique for achieving copyright protection of digital contents, and intercommunicate with each other by using a secure protocol. Moreover the server 100 and the client 300 include tamper resistance so that the DRM and data cannot be easily analyzed from outside.

The server 100 executes a digital content distributing program stored in a storage 110 such as a hard disk to realize a content generating unit 120 and a transmitting unit 130, respectively. The digital content distributing program is installed on the storage 110 from a computer-readable, non-transitory medium such as a compact disk read only memory (CD-ROM) or a digital versatile disk read only memory (DVD-ROM) by using a well-known setup program or the like.

The content generating unit 120 responds to an instruction from a user to generate a digital content to be distributed, and registers the digital content in the storage 110. The transmitting unit 130, in response to a content distribution request from the client 300, distributes the digital content registered in the storage 110.

Here, a data structure of a digital content to be distributed is explained.

Figure 2:
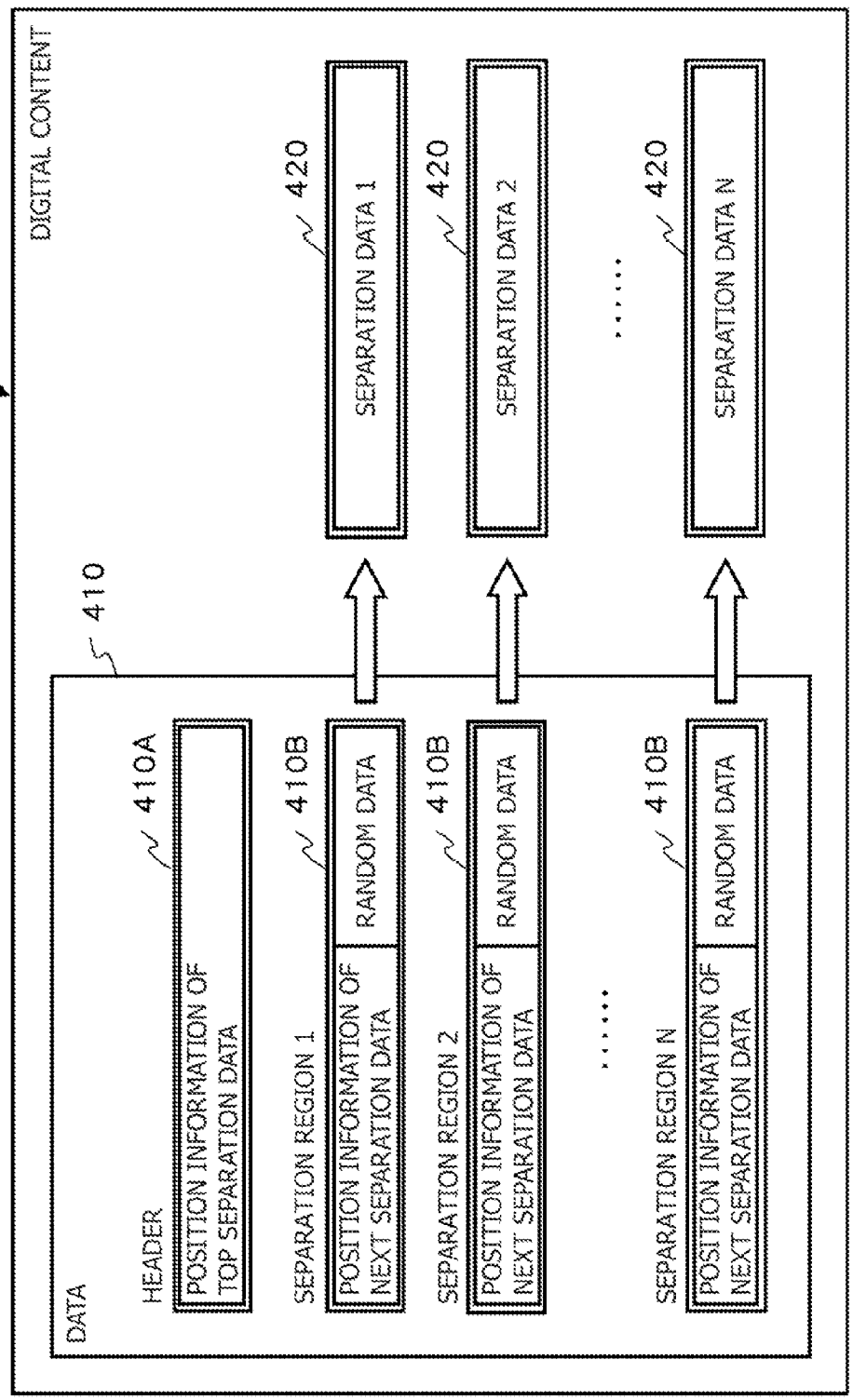
FIG. 2 is a diagram for explaining a data structure of a digital content.

As illustrated in FIG. 2, a digital content 400 includes; data (body data) 410 in which a digital copyrighted work such as a movie is stored, and a plurality of separation data 420 separated from the data 410. In a header 410A of the data 410 is set position information (for example, start position and size) for specifying a separation region 410B (separation region 1) in which one piece of separation data 420, for example, the top separation data 420 (separation data 1) is separated from the data 410. Moreover in the separation region 410B in which each piece of separation data 420 is separated from the data 410 is set position information for specifying the separation region 410B in an interlinked manner in which the next separation data 420 is separated, and arbitrary random data (dummy data). In the position information of the last separation region 410B (separation region N) of the data 410 is set information indicating that there is no next separation data 420, for example, "size=0". The data 410 and the separation data 420 are respectively encrypted by a corresponding content key.

In the storage 110, content information 500 illustrated in FIG. 3 and an expiration list 600 illustrated in FIG. 4 are respectively stored.

The content information 500 includes; a content key identifier of the data or the separation data, a content key of the data or the separation data, a content key identifier of the next separation data, content key source information of the next separation data, and the separation data which is encrypted (encrypted separation data). Here, the content key source information is formed of a character string indicating, for example, a uniform resource locator (URL) and IP address+port number. Moreover the content information 500 related to the data does not include encrypted separation data. The expiration list 600 is for specifying the separation data to expire, and includes; publisher name, number of separation data to expire, content key identifier of the separation data to expire, and digital signature with a route public key certificate. The expiration list 600 is generated and edited by a tool with which a user inputs and edits; publisher name, number of separation data to expire, content key identifier, and digital signature via, for example, a graphical user interface (GUI). The content key identifier of the separation data is also used for identifying the separation data.

On the other hand, the client 300 executes a digital content playback program stored in a storage 310 such a hard disk to realize a content information acquiring unit 320, a position information expanding unit 330, a decrypting unit 340, and a content playback unit 350, respectively. The digital content playback program is installed on the storage 310 from a computer-readable, non-transitory medium such as the CD-ROM or DVD-ROM by using a well-known setup program or the like.

The content information acquiring unit 320 acquires content information 500 of the data 410, content information 500 of the separation data 420, and the expiration list 600 from the server 100 at the time of playback the data 410 distributed by superdistribution or the like. The position information expanding unit 330 decrypts the header 410A of the data 410 and the respective separation regions 410B by using the content keys of the data 410 and the separation data 420, respectively, thereby expanding pieces of position information of the respective separation regions 410B in the data 410. The decrypting unit 340 decrypts the data 410 and the separation data 420 by using the content keys of the data 410 and the separation data 420, respectively. The content playback unit 350 refers to the position information of the respective separation regions 410B expanded by the decrypting unit 340 to playback the decrypted data 410 and separation data 420. The content information acquiring unit 320, the position information expanding unit 330, the decrypting unit 340, and the content playback unit 350 can be performed by large scale integration (LSI) implementing the DRM.

FIG. 5 illustrates a content generating process executed by the content generating unit 120 in the server 100, when a user specifies a digital content to be processed, and inputs content generating information 700 illustrated in FIG. 6. Here as illustrated in FIG. 6, the content generating information 700 includes the number of separation data to be separated from the data 410, and a plurality of pieces of separation data information. The separation data information includes; the content key identifier, the content key source information, and position information (for example, start position and size) for specifying the separation region 410B of the data 410. The content generating information 700 is generated by a tool, with which the user specifies the number of separation data and the separation data information, for example, via the GUI. The content generating information 700 may be specified by a character-based user interface (CUI). The number of separation data set in the content generating information 700 can be appropriately determined, taking into consideration the balance between playback efficiency and security strength of the digital content 400 in the client 300. This is because playback efficiency decreases if the number of separation data is too large, and the security strength decreases if the number of separation data is too small.

In step 1 (abbreviated as "S1" in the drawings, and similarly hereunder), the content generating unit 120 determines whether there is an unprocessed separation region in the data 410, for example, by determining whether the separation data 420 has been separated corresponding to the number of separation data set in the content generating information 700. Then if the content generating unit 120 determines that there is an unprocessed separation region, the processing proceeds to step 2 (Yes), while if determined that there is no unprocessed separation region, the processing proceeds to step 10 (No).

In step 2, the content generating unit 120 sequentially selects the separation data information from the content generating information 700.

In step 3, the content generating unit 120 determines whether the separation data 420 specified by the content key identifier is unregistered, by determining whether the content key identifier of the separation data information is registered in the content information 500 in the storage 110. Then if the content generating unit 120 determines that the separation data 420 is unregistered, the processing proceeds to step 4 (Yes), while if determined that the separation data 420 has been registered, the processing proceeds to step 9 (No).

In step 4, the content generating unit 120 determines whether the separation region specified by the user is appropriate, by determining whether the separation region specified by the position information of the separation data information is included in the data 410. Then if the content generating unit 120 determines that the separation region is appropriate, the processing proceeds to step 5 (Yes), while if determined that the separation region is not appropriate, the processing proceeds to step 9 (No).

In step 5, the content generating unit 120 generates a content key for encrypting the separation data 420 by using, for example, one function of the DRM.

In step 6, the content generating unit 120 separates the separation data 420 from the separation region 410B of the data 410 specified by the position information of the separation data information, and encrypts the separation data 420 by using the content key generated in step 5.

In step 7, the content generating unit 120 registers the content information 500 related to the separation data 420 in the storage 110. That is, the content generating unit 120 refers to the content generating information 700 and generates the content information 500 in which the content key identifier and the content key of the separation data 420, the content key identifier and the content key source information of the next separation data 420, and the encrypted separation data 420 are associated with each other. Then the content generating unit 120 registers the generated content information 500 in the storage 110.

In step 8, the content generating unit 120 refers to the content generating information 700, and sets the position information and random data of the next separation data in the separation region 410B in which the separation data 420 is separated from the data 410. Then the content generating unit 120 encrypts the separation region 410B of the data 410 by using the content key generated in step 5, and then the processing returns to step 1.

In step 9, the content generating unit 120 displays information indicating that the content generating information 700 is not appropriate, for example, on a display device.

In step 10, the content generating unit 120 refers to the content generating information 700, and sets the position information of the top separation data 420 in the header 410A of the data 410.

In step 11, the content generating unit 120 generates the content key for encrypting the data 410 by using, for example, one function of the DRM.

In step 12, the content generating unit 120 encrypts a part at least excluding the respective separable regions 410B of the data 410 by using the content key generated in step 11.

In step 13, the content generating unit 120 registers the data 410 and the content information 500 related to the data 410 in the storage 110. That is, the content generating unit 120 refers to the content generating information 700, and generates the content key identifier and the content key of the data 410, and the content information 500 in which the content key identifier of the top separation data 420 and the content key source information are associated with each other. Then the content generating unit 120 registers the generated content information 500 in the storage 110.

According to the content generating process, in the server 100, when a digital content to be processed and a generating method are specified, the separation data 420 is separated from the plurality of separation regions 410B of the data 410 and encrypted. On the other hand, position information for specifying the separation region 410B in which the top separation data 420 is separated, is set in the header 410A of the data 410, and position information for specifying the separation region 410B in which the next separation data 420 is separated, is set in the respective separable regions 410B of the data 410. At this time, the header 410A is encrypted by the content key of the data 410. Moreover the respective separation regions 410B are encrypted by the content key of the corresponding separation data 420.

Therefore, even if the content key of the data 410 distributed by superdistribution or the like is estimated, if the content key of each separation data 420 cannot be estimated, the position at which the separation data 420 is separated cannot be specified. Moreover, even if the content key of the separation data 420 can be estimated, the position at which the separation data 420 is separated cannot be specified, unless the respective separation regions 410B are sequentially tracked from the header 410A of the data 410. Accordingly, even if all the content keys of the digital content 400 are estimated, the digital content 400 cannot be reconstructed, unless the content keys are estimated in a specified order, thereby enabling to protect the digital content 400.

FIG. 7 illustrates a content distributing process executed by the transmitting unit 130 in the server 100, when the client 300 sends a distribution request of the content information 500.

In step 21, the transmitting unit 130 determines whether the content information 500 associated with the distribution request has been registered, for example, by determining whether the content information 500 having the content key identifier included in the distribution request has been registered in the storage 110. Then if the transmitting unit 130 determines that the content information 500 has been registered, the processing proceeds to step 22 (Yes), while if determined that the content information 500 has not been registered, the processing proceeds to step 26 (No).

In step 22, the transmitting unit 130 determines whether the distribution request is associated with the data 410, for example, by determining whether there is the encrypted separation data in the content information 500 associated with the distribution request. Then if the transmitting unit 130 determines that the distribution request is associated with the data 410, the processing proceeds to step 23 (Yes), while if determined that the distribution request is not associated with the data 410, that is, the distribution request is associated with the separation data 420, the processing proceeds to step 24 (No).

In step 23, the transmitting unit 130 sends the content information 500 specified by the content key identifier included in the distribution request, that is, the content information 500 of the data 410.

In step 24, the transmitting unit 130 determines whether the separation data 420 is the data to expire, by determining whether the content key identifier included in the distribution request, that is, the content key identifier of the separation data 420 has been registered in the expiration list 600 in the storage 110. Then if the transmitting unit 130 determines that the separation data 420 is not the data to expire, the processing proceeds to step 25 (Yes), while if determined that the separation data 420 is the data to expire, the processing proceeds to step 26 (No).

In step 25, the transmitting unit 130 sends the content information 500 specified by the content key identifier included in the distribution request, and the expiration list 600.

In step 26, because the content information 500 associated with the distribution request is unregistered or it is the separation data 420 to expire, the transmitting unit 130 sends an error message.

According to the content distributing process, in the server 100, when the client 300 sends a distribution request, it is determined whether the distribution request is associated with the data 410, by determining whether there is the encrypted separation data in the content information 500 specified by the content key identifier. Then if the distribution request is associated with the data 410, the content information 500 of the data 410 is sent, while if the distribution request is associated with the separation data 420, the content information 500 of the separation data 420, and the expiration list 600 are sent.

Therefore, the client 300 can use the sent content information 500 to reconstruct the digital content 400 including the data 410 and the separation data 420. Moreover because the expiration list 600 is sent in addition to the content information 500 of the separation data 420, the expiration list 600 defining the separation data 420 to expire can be updated to the latest one.

FIG. 8 illustrates the content information acquiring process executed by the content information acquiring unit 320, when playback of the data 410 is started in the client 300. The content key identifier and the content key source information of the data 410 are acquired as meta-information included in the license, for example, at the time of purchasing the license of the digital content 400 online.

In step 31, the content information acquiring unit 320 requests the server 100 specified by the content key source information included in the meta-information to transmit the content information 500 of the data 410 specified by the content key identifier.

In step 32, the content information acquiring unit 320 determines whether there is a response from the server 100, that is, whether the content information 500 of the data 410 has been received. Then if there is a response from the server 100, the processing proceeds to step 33 (Yes), while if there is no response from the server 100, the content information acquiring unit 320 repeats a reception determining process (No). When the server 100 sends an error message, the content information acquiring unit 320 displays a message on the display device indicating for example that the digital content 400 cannot be played back, after which playback of the data 410 is suspended (similarly hereunder).

In step 33, the content information acquiring unit 320 registers the content information 500 of the data 410 in the storage 310.

In step 34, the content information acquiring unit 320 determines whether there is the next separation data 420, for example, based on the content key identifier of the next separation data in the content information 500. Then if the content information acquiring unit 320 determines that there is the next separation data 420, the processing proceeds to step 35 (Yes), while if determined that there is no next separation data 420, the processing proceeds to step 38 (No).

In step 35, the content information acquiring unit 320 requests the server 100 specified by the content key source information of the next separation data in the received content information 500 to transmit the content information 500 of the separation data 420 specified by the content key identifier.

In step 36, the content information acquiring unit 320 determines whether there is a response from the server 100, that is, whether the content information 500 of the separation data 420 and the expiration list 600 have been received. Then if there is a response from the server 100, the processing proceeds to step 37 (Yes), while if there is no response from the server 100, the content information acquiring unit 320 repeats the reception determining process (No).

In step 37, the content information acquiring unit 320 registers the content information 500 of the separation data 420, and the expiration list 600 in the storage 310. Thereafter the content information acquiring unit 320 returns the processing to step 34.

In step 38, the content information acquiring unit 320 notifies the position information expanding unit 330 to start the position information expanding process.

According to the content information acquiring process, when the client 300 starts playback of the data 410, the server 100 specified by the meta-information is requested to transmit the content information 500 of the data 410. Then the content information 500 of the data 410 received from the server 100 is registered in the storage 310, and the server 100 specified by the content information 500 is requested to transmit the content information 500 of the top separation data 420. Then the content information 500 of the separation data 420 received from the server 100 is registered in the storage 310. Thereafter, pieces of content information 500 of the separation data 420 are sequentially requested until there is no next separation data 420 specified by the content information 500, and various data required for playing back the digital content 400 are acquired collectively.

FIG. 9 illustrates the position information expanding process executed by the position information expanding unit 330 when the client 300 receives a notification from the content information acquiring unit 320.

In step 41, the position information expanding unit 330 reads the content information 500 of the data 410 specified by the content key identifier included in the meta-information, from the storage 310.

In step 42, the position information expanding unit 330 decrypts the header 410A of the data 410 by using the content key of the content information 500.

Figure 10:
FIG. 10 is a diagram for explaining a position information list.

In step 43, the position information expanding unit 330 stores the position information of the top separation data set in the header 410A of the data 410 in a volatile memory such as a random access memory (RAM) as a position information list 800 having a data structure as illustrated in FIG. 10. The position information list 800 includes the number of separation data, the content key identifier of each separation data, and position information of each separation data. At this time, the position information expanding unit 330 increments the number of separation data and stores the content key identifier of the top separation data in the memory, in addition to the position information of the top separation data.

In step 44, the position information expanding unit 330 determines whether there is the next separation data 420, for example, based on the content key identifier of the next separation data of the content information 500. Then if the position information expanding unit 330 determines that there is the next separation data 420, the processing proceeds to step 45 (Yes), while if determined that there is no next separation data 420, the processing proceeds to step 49 (No).

In step 45, the position information expanding unit 330 reads the content information 500 of the separation data 420 specified by the content key identifier of the next separation data of the content information 500, from the storage 310.

In step 46, the position information expanding unit 330 determines whether the separation data 420 is the data to expire, by determining whether the content key identifier of the content information 500 of the separation data 420 has been registered in the expiration list 600 in the storage 310. Then if the position information expanding unit 330 determines that the separation data 420 is not the data to expire, the processing proceeds to step 47 (Yes), while if determined that the separation data 420 is the data to expire, the processing proceeds to step 50 (No).

In step 47, the position information expanding unit 330 decrypts the separation region 410B of the data 410 specified by the position information of the separation data stored last in the position information list 800, by using the content key of the content information 500 read in step 45.

In step 48, the position information expanding unit 330 stores the position information of the next separation data set in the separation region 410B decrypted in step 47 in the memory as the position information list 800. At this time, the position information expanding unit 330 increments the number of separation data and stores the content key identifier of the next separation data in the memory, in addition to the position information of the next separation data. Thereafter, the position information expanding unit 330 returns the processing to step 44.

In step 49, because all the pieces of position information of the separation data 420 are expanded, the position information expanding unit 330 notifies the decrypting unit 340 that the decrypting process should be started.

In step 50, because the separation data 420 to be processed has been expired, the position information expanding unit 330 deletes the content information 500 associated with the expired separation data 420 from the storage 310.

In step 51, the position information expanding unit 330 displays on the display device, for example, information indicating that the digital content 400 cannot be played back.

According to the position information expanding process, the header 410A of the data 410 is decrypted by using the content key specified by the content key identifier included in the meta-information, and the position information of the top separation data set in the header 410A is stored in the memory. Next the next separation region 410B of the data 410 is decrypted by using the content key specified by the content key identifier of the next separation data in the content information 500 associated with the separation data 420, and the position information of the next separation data set in the separation region 410B is stored in the memory. Then the process is sequentially performed to expand all the pieces of position information of the separation data 420 on the memory.

Figure 11:
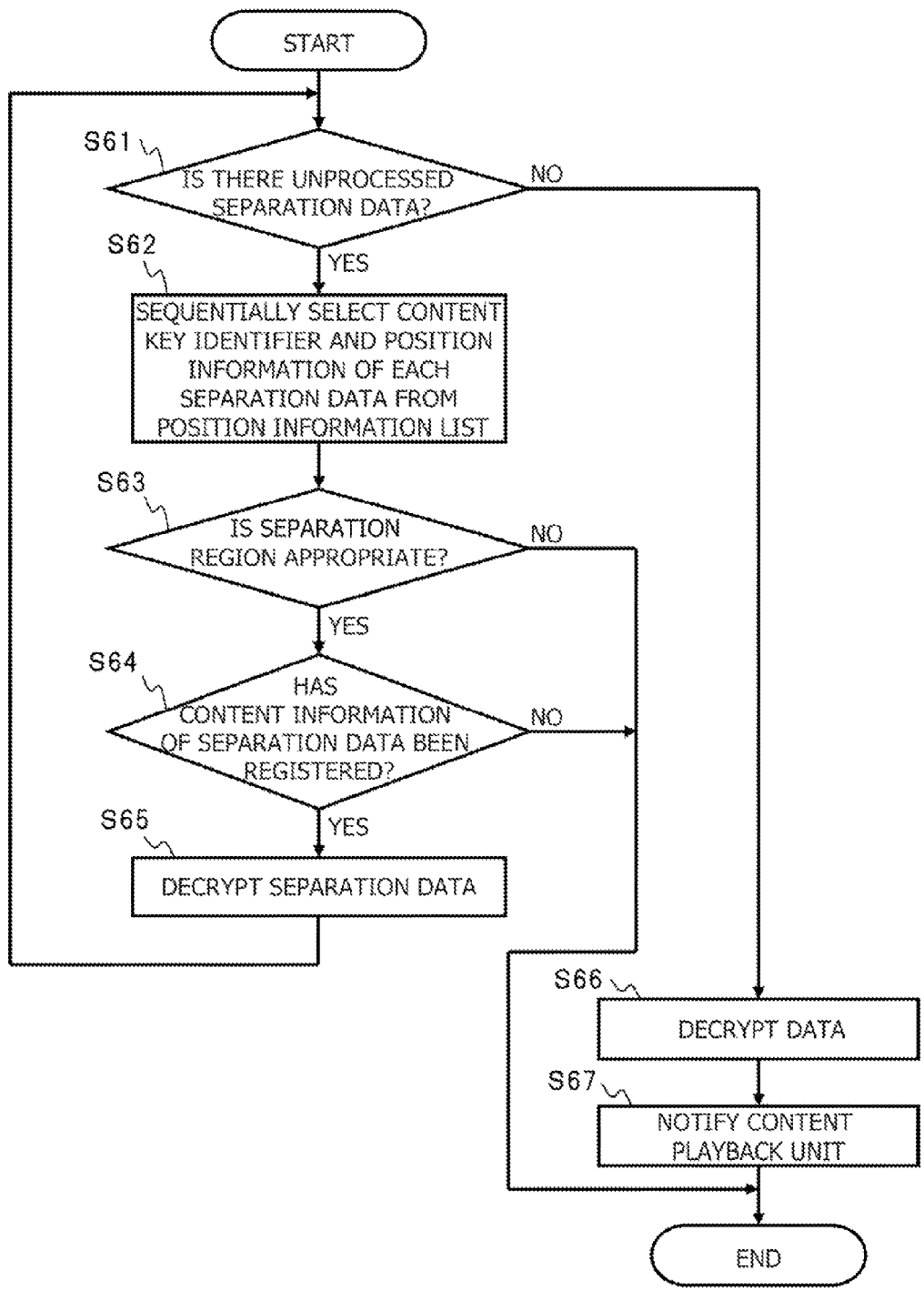
FIG. 11 is a flowchart illustrating a decrypting process.

FIG. 11 illustrates the decrypting process executed by the decrypting unit 340 when the client 300 receives a notification from the position information expanding unit 330.

In step 61, the decrypting unit 340 determines whether there is unprocessed separation data 420, for example, by determining whether the separation data 420 has been decrypted for the number of separation data 420 set in the position information list 800. Then if the decrypting unit 340 determines that there is the unprocessed separation data 420, the processing proceeds to step 62 (Yes), while if determined that there is no unprocessed separation data 420, the processing proceeds to step 66 (No).

In step 62, the decrypting unit 340 sequentially selects the content key identifier and the position information of each separation data 420 from the position information list 800.

In step 63, the decrypting unit 340 determines whether the separation region 410B in which the separation data 420 is separated is appropriate, by determining whether the separation region 410B specified by the position information of the separation data 420 is included in the data 410. Then if the decrypting unit 340 determines that the separation region 410B is appropriate, the processing proceeds to step 64 (Yes), while if determined that the separation region 410B is not appropriate, the processing is terminated (No).

In step 64, the decrypting unit 340 determines whether the content information 500 of the separation data 420 has been registered, by determining whether the content key identifier of the separation data 420 has been registered in the content information 500 in the storage 310. Then if the decrypting unit 340 determines that the content information 500 of the separation data 420 has been registered, the processing proceeds to step 65 (Yes), while if determined that the content information 500 of the separation data 420 has not been registered, the processing is terminated (No).

In step 65, the decrypting unit 340 decrypts the separation data 420 specified by the content key identifier by using the content key of the content information 500. Thereafter, the decrypting unit 340 returns the processing to step 61.

In step 66, because all the separation data 420 are decrypted, the decrypting unit 340 decrypts the data 410 by using the content key specified by the content key identifier included in the meta-information.

In step 67, the decrypting unit 340 notifies the content playback unit 350 that the digital content 400 should be played back.

According to the decrypting process, while determining whether the separation region 410B corresponding to each separation data 420 is appropriate by using the position information list 800 created by the position information expanding unit 330, each separation data 420 is decrypted. Moreover when decrypting of all the separation data 420 is completed, the data 410 is decrypted.

Figure 12:
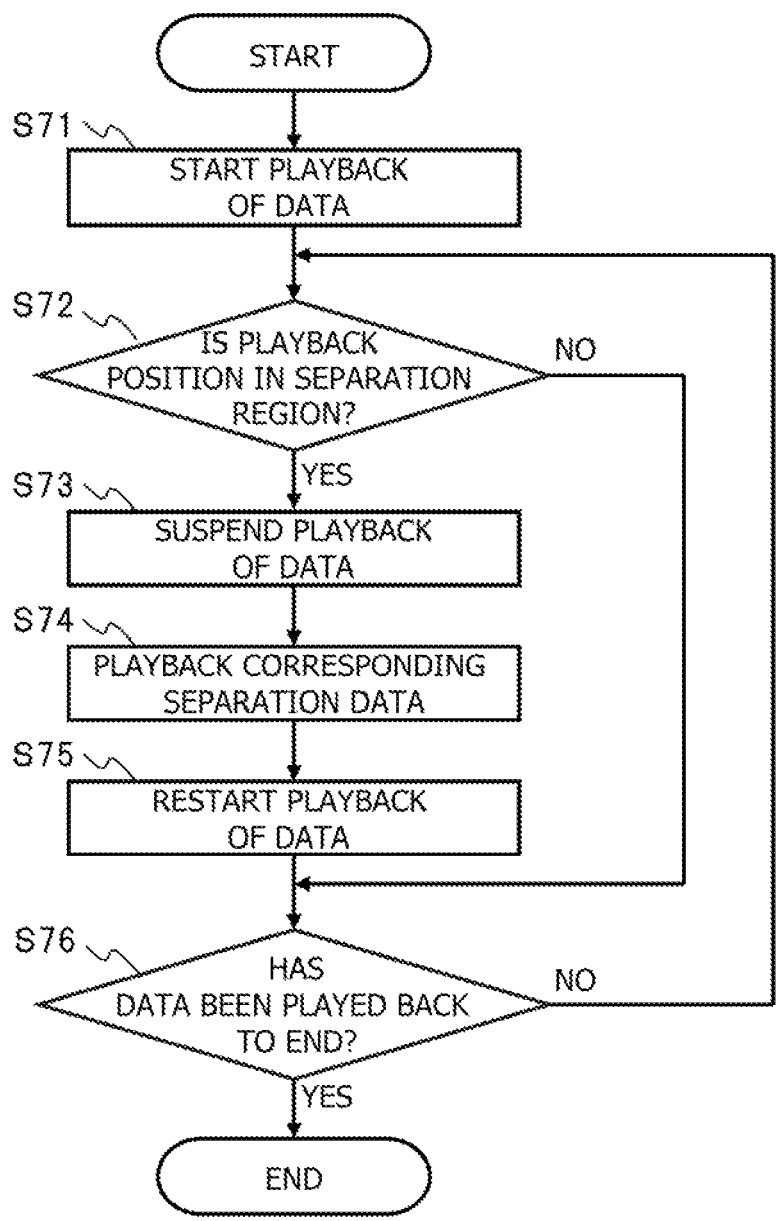
FIG. 12 is a flowchart illustrating a content playback process.

FIG. 12 illustrates a content playback process executed by the content playback unit 350 when the client 300 receives a notification from the decrypting unit 340. In the case where the digital content 400 is a video picture, a playback result of the data 410 and the separation data 420 is output to the display device.

In step 71, the content playback unit 350 starts playback of the data 410.

In step 72, the content playback unit 350 refers to the position information list 800 expanded on the memory to determine whether the playback position is in the separation region 410B of the data 410. Then if the content playback unit 350 determines that the playback position is in the separation region 410B, the processing proceeds to step 73 (Yes), while if determined that the playback position is not in the separation region 410B, the processing proceeds to step 76 (No).

In step 73, the content playback unit 350 suspends playback of the data 410.

In step 74, the content playback unit 350 plays back the separation data 420 corresponding to the playback position.

In step 75, the content playback unit 350 restarts playback of the data 410 from the next position in the separation region 410B.

In step 76, the content playback unit 350 determines whether the data 410 have been played back to the end. Then if determined that the data 410 have been played back to the end, the content playback unit 350 terminates the process (Yes), while if determined that the data 410 have not been played back to the end, the processing is returned to step 72 (No).

According to the content playback process, after playback of the data 410 is started, when the playback position reaches the separation region 410B, playback of the data 410 is temporarily suspended, and the separation data 420 corresponding to the separation region 410B is played back. Therefore, the user of the digital content 400 can use the distal content 400 without noticing that the data 410 and the separation data 420 are separated from each other.

Accordingly, because various data required for playback is prepared beforehand, before the digital content 400 is actually played back, the client 300 can playback the digital content 400 without a pause. Therefore, even if the data 410 and the plurality of separation data 420 of the digital content 400 are distributed on separate routes, there is no problem in playback.

Moreover even after the separation data 420 is distributed to the client 300, the expiration list 600 is distributed from the server 100 to the client 300 at the time of distributing the separation data 420. Therefore, the distributed separation data 420 can be invalidated and deleted. As a result, the digital content 400 can be protected further.

Next, in order to facilitate understanding of the present technique, processes from generation to playback of the digital content 400 will be explained, assuming a specific example. In the explanation below, in order to clarify an association among the data or separation data, the content key, and the separation region, interrelated elements are denoted by the same reference symbols.

[Generating Process]

A case is assumed where in the server 100, data 1 of a digital content to be processed as illustrated in FIG. 13 is specified, and content generating information 700 as illustrated in FIG. 14 is input. Here it is assumed that the data 1 of the digital content to be processed has a data structure in which packets including a 4-byte header and a 184-byte payload are consecutive, and separation data 11 and 12 are respectively stored in the payload of packets 1 and 3.

Figure 15:
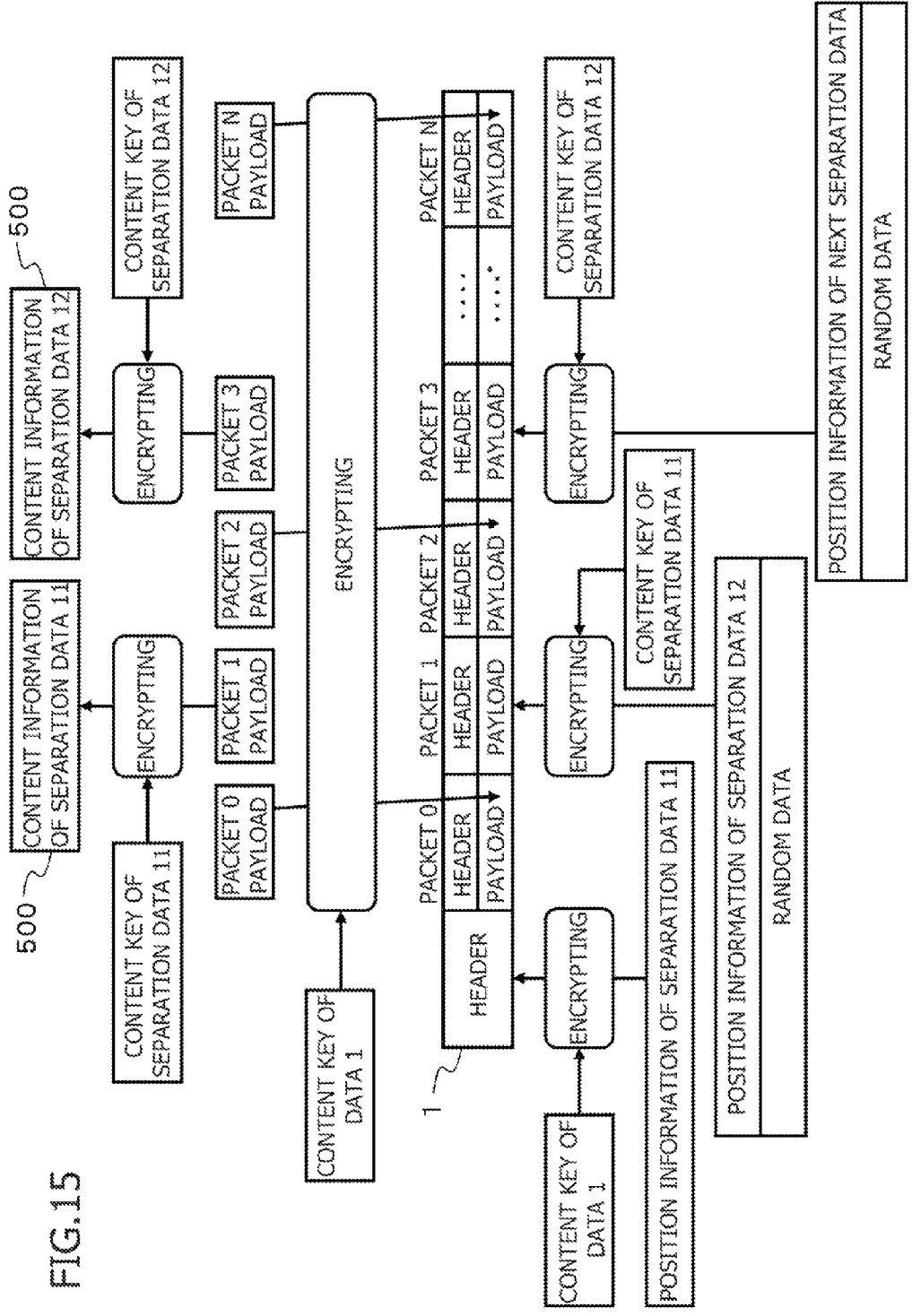
FIG. 15 is a diagram for explaining a specific example of a digital content generating method.
Figure 16:
FIG. 16 is a diagram for explaining a specific example of content information of the data.
Figure 17:
FIG. 17 is a diagram for explaining a specific example of content information of one separation data.

As illustrated in FIG. 15, when the generating process is started, the position information of the separation data 11 set in the content generating information 700 is encrypted by using the content key of the data 1, and added to the top of the data 1 as a header. Furthermore the payload of packet 0 in which a part of the digital copyrighted work associated with the data 1 is stored is encrypted by using the content key of the data 1. Moreover, the payload of packet 1 in which the separation data 11 is stored is encrypted by using the content key of the separation data 11, and content information 500 of the separation data 11 is generated based on the separation data information set in the content generating information 700. Next the position information and random data of the separation data 12 set in the content generating information 700 is encrypted by using the content key of the separation data 11, and stored in the payload of packet 1 in which the separation data 11 has been stored. Then by repeating the same processes from packet 2 to packet N, data 1 and the content information 500 of the data 1 and the separation data 11 and 12 as illustrated in FIG. 16 to FIG. 18 are respectively generated.

When the process has finished up to packet N of the data 1, the content information 500 of the data 1 is generated based on the separation data information set in the content generating information 700. Here because there is no next separation data of the separation data 12, then as illustrated in FIG. 18, for example, NULL is set in the content key identifier and the content key source information of the next separation data in the content information 500 of the separation data 12.

Figure 19:
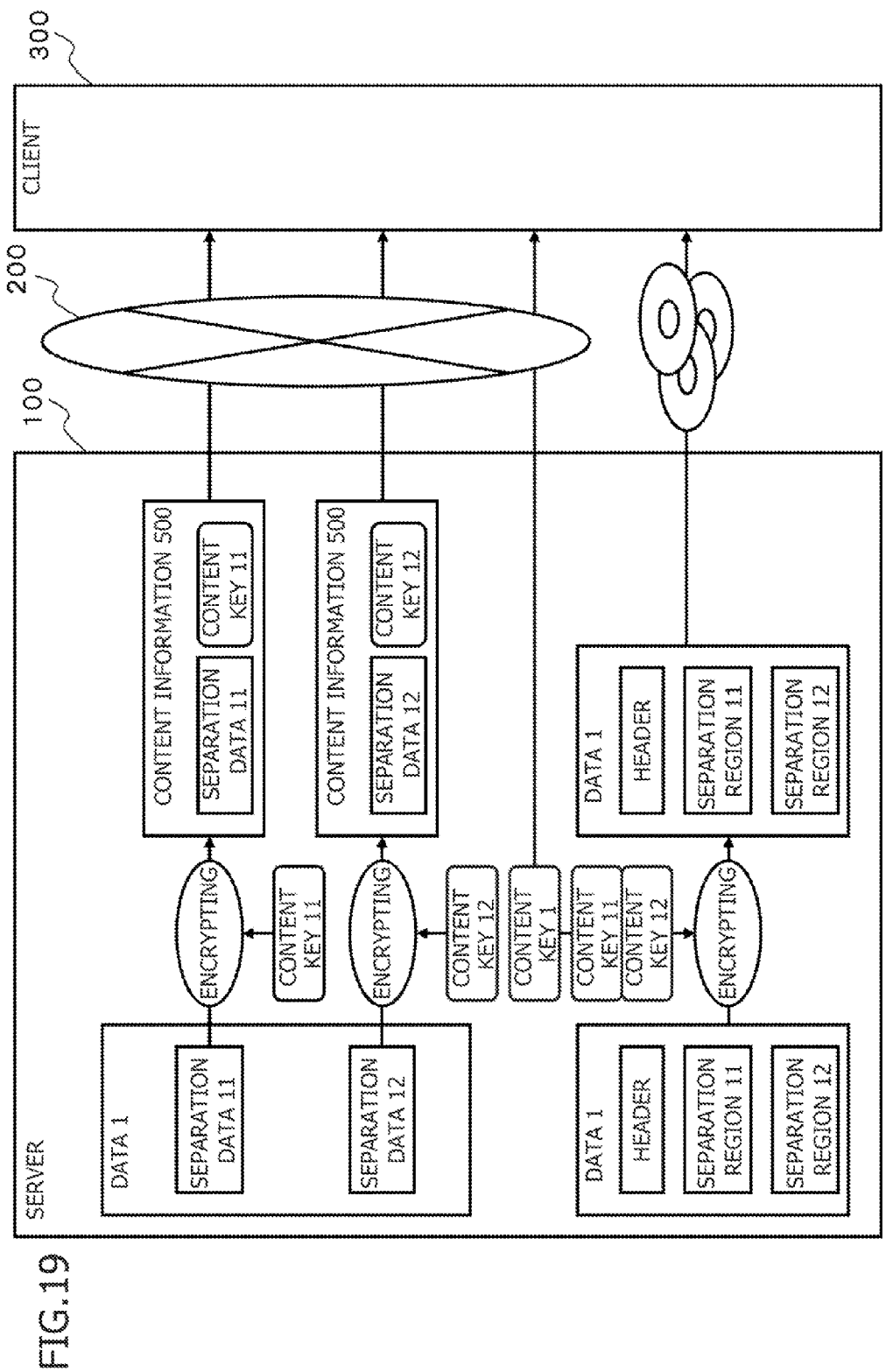
FIG. 19 is a diagram for explaining a digital content generating process.

In the generating process, essentially as illustrated in FIG. 19, the content information 500 in which the separation data 11 of the data 1 is encrypted is generated by using a content key 11 of the separation data 11. Moreover, the content information 500 in which the separation data 12 of the data 1 is encrypted is generated by using a content key 12 of the separation data 12. Furthermore, the header of the data 1 and a part of the data 1 in which the digital copyrighted work is stored are encrypted by using a content key 1 of the data 1, and separation regions 11 and 12 of the data 1 are respectively encrypted by using the content keys 11 and 12. Then the encrypted data 1 is stored in a recording medium such as a CD-ROM or DVD-ROM, and distributed to a market by for example superdistribution.

[Distributing Process to Playback Process]

(1) Content Information Acquiring Process of Content Information Acquiring Unit 320

When the client 300 starts playback of the data 1, then as illustrated in FIG. 20, the server 100 specified by the meta-information is requested to transmit the content information 500 of the data 1 specified by the meta-information. When the server 100 sends the content information 500 of the data 1, the server 100 specified by the content key source information of the separation data 11 is requested to transmit the content information 500 of the separation data 11 specified by the content key identifier. When the server 100 sends the content information 500 of the separation data 11, the server 100 specified by the content key source information of the separation data 12 is requested to transmit the content information 500 of the separation data 12 specified by the content key identifier. When the server 100 sends the content information 500 of the separation data 12, because the content key identifier of the next separation data is "NULL", it is determined that various data required for playing back the data 1 has been acquired.

(2) Position Information Expanding Process of Position Information Expanding Unit 330

The header of the data 1 is decrypted by using the content key 1 of the data 1, and the position information of the separation data 11 is expanded on the memory. Furthermore the separation region 11 of the data 1 specified by the position information of the separation data 11 is decrypted by using the content key 11 of the separation data 11, and the position information of the separation data 12 is expanded on the memory. Moreover, the separation region 12 of the data 1 specified by the position information of the separation data 12 is decrypted by using the content key of the separation data 12, and it is determined that there is no next separation data.

(3) Decrypting Process of Decrypting Unit 340

Data A and B in which digital copyrighted work is stored in the data 1 are decrypted by using the content key 1 of the data 1. Moreover, the separation data 11 included in the content information 500 of the separation data 11 is decrypted by using the content key 11 of the separation data 11, and the separation data 12 included in the content information of the separation data 12 is decrypted by using the content key 12 of the separation data 12.

(4) Content Playback Process Performed by Content Playback Unit 350

The decrypted data A, separation data 11, data B, and separation data 12 are played back in this order by using the position information of the separation data 11 and 12 expanded on the memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing a digital content distributing program causing a server for distributing digital content, and a digital content playback program causing a client, the digital content including;

data in which digital copyrighted work is stored, and a plurality of separation data separated from the data, the data having a header, which stores position information for specifying a separation region in which one of the plurality of separation data is separated, and each separation region in which the separation data is separated stores only random data and position information for specifying other separation regions in an interlinked manner and separates portions of the data in which the digital copyright work is stored, and the data excluding the separation region is encrypted by a content key of the data, while the separation region of the data and the separation data separated from the separation region are encrypted respectively by a content key different for each separation data, the digital content distributing program causing the server to execute a process, the process comprising:

sending a content key of the data associated with a distribution request of the content key for decrypting the data, and an identifier for identifying the separation data separated from the separation region specified by the position information stored in the header of the data when there is the distribution request; and sending separation data associated with a distribution request of the separation data specified by the identifier, a content key of the separation data, and an identifier for identifying the separation data separated from the separation region specified by the position information stored in the separation region in which the separation data is separated when there is the distribution request;

the digital content playback program causing the client to execute a process, the process comprising:

decrypting the data excluding the separation region by using the content key of the data, and decrypting the separation region of the data and the separation data by using the content key of the separation data; and playing back the data and the separation data based on the separation region specified by the position information stored in the header of the data and in the separation data.

* * * * *